No. 608,007. Patented July 26, 1898.
R. M. REILLY.
GAS TIGHT CONNECTION FOR TRAPS OR PIPES AND WATER CLOSET BOWLS.
(Application filed June 30, 1897.)
(No Model.)
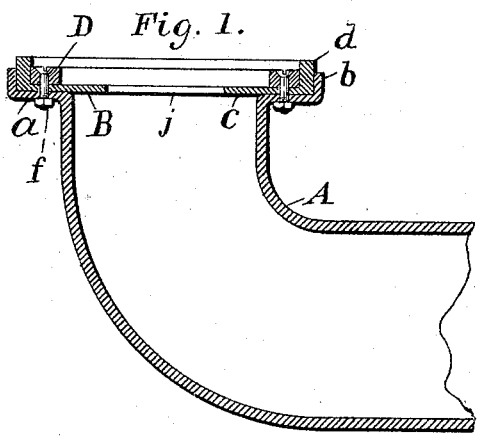
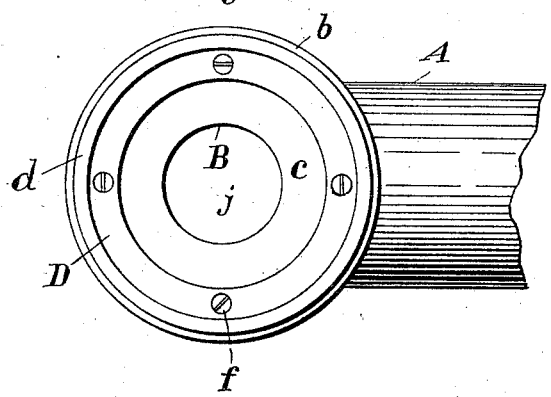
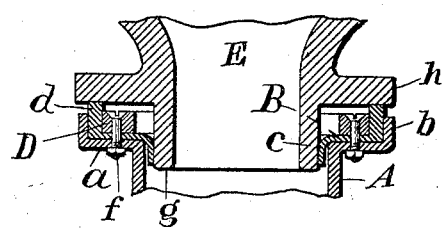
WITNESSES
Dan'l Fisher
H. Constantine
INVENTOR
Robert M. Reilly
by Geo. W. J. Mead
Atty.

UNITED STATES PATENT OFFICE.

ROBERT M. REILLY, OF BALTIMORE, MARYLAND.

GAS-TIGHT CONNECTION FOR TRAPS OR PIPES AND WATER-CLOSET BOWLS.

SPECIFICATION forming part of Letters Patent No. 608,007, dated July 26, 1898.

Application filed June 30, 1897. Serial No. 642,950. (No model.)

*To all whom it may concern:*

Be it known that I, ROBERT M. REILLY, of the city of Baltimore and the State of Maryland, have invented certain Improvements in Means for Forming a Gas-Tight Connection Between a Water-Closet Bowl and a Trap or Pipe, of which the following is a specification.

In the description of the said invention which follows reference is made to the accompanying drawings, forming a part hereof, and in which—

Figure 1 is a certain sectional view of a part of a trap or pipe adapted for the reception of a water-closet bowl, illustrating the invention as it appears before the attachment of the bowl. Fig. 2 is a top view of Fig. 1. Fig. 3 is a view similar to Fig. 1, except that the bowl is shown as connected to the trap or pipe.

Referring now to the drawings, A is a pipe or trap having a flange $a$ and a rim $b$ at its edge.

B is a rubber gasket consisting of the flat annular plate $c$ and the raised circumferential rim $d$. The annular plate is made considerably thinner than the rim for the reason that it is intended to be distorted or changed in shape in the application of the bowl thereto, while the rim is designed to maintain its configuration under pressure, as will hereinafter appear.

The gasket B is seated on the flange $a$ with the rim thereof in contact with and projecting above the rim $b$ of the flange, and it is held in place by the metallic ring D and the bolts $f$.

E represents the lower portion of the water-closet bowl, having the cylindrical nozzle $g$ and the flange $h$, as is common. The nozzle is smaller than the interior of the pipe or trap and considerably larger than the hole $j$ in the gasket, so that when the nozzle is thrust through the gasket a portion of the plate $c$ thereof tightly clamps the exterior surface of the nozzle and follows the nozzle into the pipe A, as shown in Fig. 3. This forms a perfectly gas and water tight joint, and the flange $h$ of the bowl rests on the rim of the gasket, which is compressible, and thoroughly isolates the introverted portion of the gasket and the metallic ring D from the exterior air.

Bolts or any other suitable devices (not shown) are employed to complete the connection between the bowl and trap.

The nozzle being cylindrical and devoid of any projecting bead at its lower end can be easily inserted through the gasket and withdrawn therefrom without injuring or in any manner impairing the joint so as to prevent or interfere with a subsequent connection.

I claim as my invention—

1. In combination with a trap or pipe with a flange, and a water-closet bowl having a cylindrical nozzle which is smaller than the interior of the said pipe or trap, a rubber gasket having a central hole which is smaller than the nozzle of the bowl and provided with a circumferential rim on its upper side which is thicker than the remaining portion of the gasket, and a securing metallic ring which bears on the portion of the gasket which is within the rim thereof, substantially as specified.

2. In combination with a trap or pipe with a flange and an exterior rim, and a water-closet bowl having a cylindrical nozzle which is smaller than the interior of the said pipe or trap, a rubber gasket having a central hole which is smaller than the nozzle of the bowl and provided with a rim which is thicker than the remaining portion of the gasket, the said gasket being secured on the flange of the pipe or trap by means of a metallic ring, with the edge of the rim projecting above the rim of the flange of the pipe or trap, substantially as specified.

ROBERT M. REILLY.

Witnesses:
DANL. FISHER,
G. K. HUTCHINS.